UNITED STATES PATENT OFFICE.

WILHELM HERZBERG AND OSCAR WEBER, OF BERLIN, GERMANY, ASSIGNORS TO THE ACTIEN-GESELLSCHAFT FÜR ANILIN FABRIKATION, OF SAME PLACE.

BLUE DYE.

SPECIFICATION forming part of Letters Patent No. 522,897, dated July 10, 1894.

Application filed February 7, 1894. Serial No. 499,393. (Specimens.)

*To all whom it may concern:*

Be it known that we, WILHELM HERZBERG and OSCAR WEBER, of Berlin, in the Kingdom of Prussia, German Empire, have invented new and useful Improvements in the Manufacture of Blue Mordant Dyeing Coloring-Matters; and we do hereby declare that the following is a full, clear, and exact description of the invention, which will enable others skilled in the art to which it appertains to make and use the same.

This invention is based on the observation that the products obtained by the condensation of orthoquinones or their sulfo-acids with alkyl-para-phenylendiamins or their sulfo-acids, when heated with sulfur and fuming sulfuric acid, yield valuable blue coloring-matters, capable of forming with metallic mordants lakes, which dye with beautiful fast blue tints and are especially well suited for dyeing and printing wool and cotton, previously mordanted with chromium.

In carrying out our invention practically we can proceed as follows: 13.6 kilograms dimethylparaphenylendiamin (as hydrochloric salt) are dissolved in two hundred liters of water and while agitating 35.6 kilograms potassium salt of the alpha beta naphtaquinone-disulfo-acid are added. The condensation-product thus obtained which forms in dry state a blue-black powder may be transformed in the blue dye-stuff in the following manner: Twenty kilograms of the same and four kilograms flowers of sulfur are dissolved in two hundred and fifty kilograms of fuming sulfuric-acid, containing about twenty-three per cent. of anhydride. The mixture is well stirred for some hours. In order to complete the production of the coloring-matter the sulfuric solution is finally gently heated (from about 40° to 90°). The reaction is completed as soon as a test-sample of the mixture poured into water and boiled yields a bright blue liquid. The whole liquid is poured into water and ice and the solution is heated to boiling. The precipitate is separated by filtration and afterward dissolved in diluted soda solution. The solution obtained is filtered in order to remove the sulfur and the coloring-matter is then precipitated by means of hydrochloric acid or with common salt.

The constitutional formula of the new dye stuff is as follows:

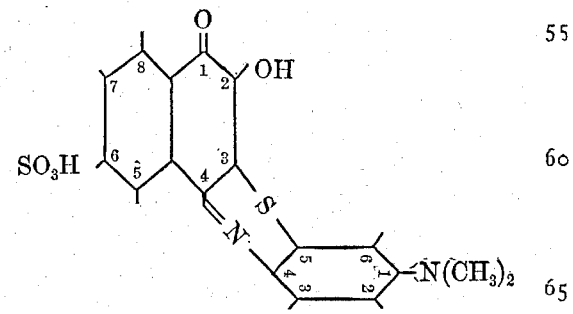

The new product thus obtained forms a blue crystalline powder which is moderately soluble in cold, better in hot water with a bright blue color; on addition of caustic soda-solution the color turns more dull. Its solution in concentrated sulfuric acid possesses a green color. On adding water the color changes into blue and the coloring-matter separates in the shape of a blue powder. It is slightly soluble in alcohol with a violet color, insoluble in ether. On the addition of zinc-powder or stannous-chlorid and hydrochloric-acid the aqueous solution is decolored, but readily assumes the original blue color by reoxidation in the open air.

In the above-described process for the sulfur may be substituted substances capable of forming sulfur sesquioxide ($S_2O_3$) when used along with fuming sulfuric acid.

When employing instead of quinonesulfo acids the quinones themselves we obtain practically the same result, because in these cases a sulfonation takes place by the treatment with fuming sulfuric acid.

Having now described our invention and in what manner the same is to be performed, what we claim as new, and desire to secure by Letters Patent, is—

1. The process for the production of blue dyes which consists in heating the condensation products of an orthoquinone compound and an alkyl-para-phenylendiamin compound with sulfur and fuming sulfuric acid in the manner as hereinbefore described.

2. As a new article of manufacture the blue coloring-matter derived from an orthoquinone compound and an alkyl-para-phenylendiamin compound, having, (in case alpha₁-beta₂-naphtaquinone beta₃-sulfoacid and dimethyl-para-phenylendiamin be used) the formula:

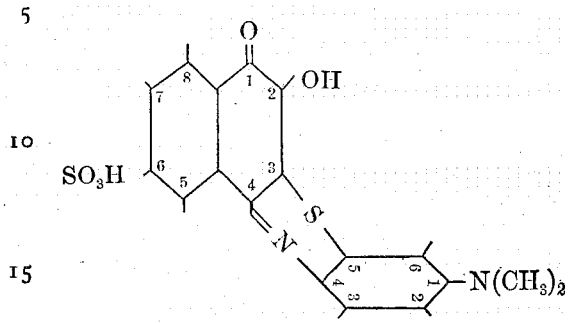

said dye being slightly soluble in alcohol with a violet color, insoluble in ether, moderately soluble in cold, more readily in hot water with a bright blue color, which on addition of caustic soda-solution turns more dull; dissolving in concentrated sulfuric acid with a green color, which on adding water changes into blue while the coloring-matter is separated in the shape of a blue powder; yielding by reduction a leuco compound, readily reoxidizable.

In testimony whereof we hereunto set our hands and affix our seals, in the presence of two witnesses, this 25th day of January, A. D. 1894.

WILHELM HERZBERG. [L. S.]
OSCAR WEBER. [L. S.]

Witnesses:
REINHOLD SCHÖNBRODT,
GUSTAV LUCHT.